Feb. 26, 1952      J. A. VICTOREEN      2,587,254
INDICATING POCKET IONIZATION CHAMBER
Filed April 16, 1948      3 Sheets-Sheet 1

INVENTOR.
JOHN A. VICTOREEN
BY
J. D. Douglass

Feb. 26, 1952 J. A. VICTOREEN 2,587,254
INDICATING POCKET IONIZATION CHAMBER
Filed April 16, 1948 3 Sheets-Sheet 2

INVENTOR.
JOHN A. VICTOREEN
BY
J. D. Douglass

INVENTOR.
JOHN A. VICTOREEN
BY

Patented Feb. 26, 1952

2,587,254

UNITED STATES PATENT OFFICE 2,587,254

INDICATING POCKET IONIZATION CHAMBER

John A. Victoreen, Cleveland, Ohio, assignor to The Victoreen Instrument Company, Cleveland, Ohio Application April 16, 1948, Serial No. 21,408

16 Claims. (Cl. 250—83.6)

This invention relates to improvements in instruments for the measurement of radiant energy, and more particularly to improvements in ionization chambers.

In connection with work in nuclear physics, or for that matter, any place where radiant energy such as alpha, beta, gamma or X-rays are apt to be present, it is desirable to provide means for determining the quantity of such rays to which a person may have been subjected over a period of time, with a view to preventing the person from being subjected to a great quantity of rays which may be injurious to health.

Heretofore, many devices have been proposed for determining the quantity of rays to which a person was subjected. One such device is illustrated and described in my copending application for "Ionization chamber," Serial No. 724,601, filed January 27, 1947, wherein there is disclosed a so-called pocket ionization chamber.

Although many prior devices have been made for measuring or indicating the passage of the emanations mentioned, these instruments had certain disadvantages which the present invention overcomes.

The prior devices were usually relatively expensive and complicated apparatus, contemplating some kind of an ionization chamber and a device for indicating the state of charge thereon or, as in the case of the application mentioned above, included an ionization chamber which was separable from the indicating apparatus. In the first instance, the apparatus was too heavy and cumbersome to be carried on the person and was such a device as was relatively delicate in its construction. The second device, although portable and highly practicable, had the disadvantage that the state of charge would not be determined without connecting the device to a separate instrument for reading the charge. So far as I am aware, no highly portable rugged device has been made wherein the state of charge can be determined without recourse to a separate instrument.

The present invention contemplates an extremely rugged device which may be carried on the person and on which the state of charge may be read at any time. This enables the person using it to determine the amount of radiation to which he has been subjected by merely looking at an indicator on the device. This may be done without the necessity of connecting this device to a separate indicating instrument.

Still another advantage of my invention resides in the provision of a device wherein the effective volume of the ionization chamber may be made to change during ionization. This enables a device to be made which is extremely sensitive for small radiations and wherein the sensitivity is decreased with prolonged radiation, which thus extends the range of measurements that may be made without causing the indicator to run off scale or completely discharging the ionization chamber.

Another advantage of the invention resides in the fact that the device may be charged without subjecting the interior to the ambient atmosphere, since it lends itself ideally to making a sealed unit which need never be opened except for repair.

Still other advantages of the invention, and the invention itself, will become more apparent from the following description of some embodiments thereof, which description is illustrated in the accompanying drawings and form a part of this specification.

In the drawings.

In the drawings like parts have been designated by like reference characters.

Broadly speaking, my invention includes an ionization chamber, a fixed wall of which comprises one of the electrodes and the other electrode of which composes a movable vane. The vane and wall, which constitutes the electrode, may be charged to a predetermined potential difference. Due to the electrical attraction between the vane and the wall, the vane is caused to assume a certain position. As the chamber is subjected to radiation, ionization takes place, causing the difference in potential to be reduced and resulting in a movement of the vane from the original charged positions. This enables the vane, or a pointer connected to it, to actually indicate the state of charge or discharge and, hence, the amount of radiation to which the chamber has been subjected.

Figure 1:
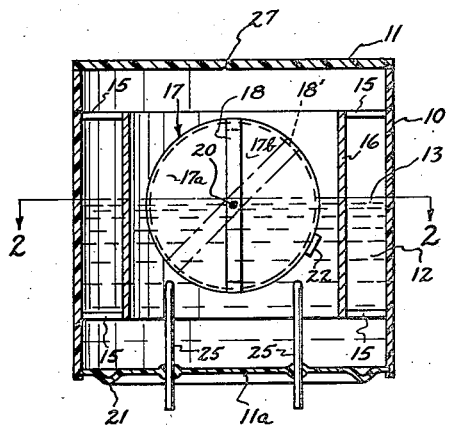
Fig. 1 is a view partly in section and partly in elevation of an embodiment of my invention.
Figure 2:
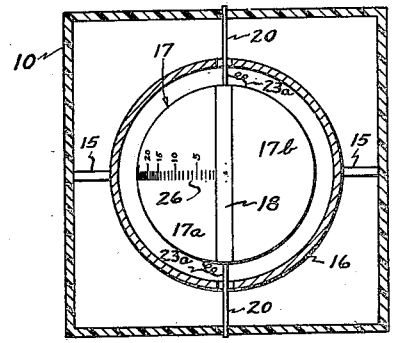
Fig. 2 is a view taken from a plane indicated by the line 2—2 of Fig. 1, looking in the direction of the arrows.

One form of the invention is illustrated in Figs. 1 and 2, wherein there is provided a container 10 which may be of any suitable plastic or synthetic resin material and wherein the top wall 11 should preferably be transparent. The container is provided with a quantity of liquid 12 filled to a level indicated at 13. The liquid should be of an insulating characteristic, and preferably one that has a very high insulation value. Certain types of mineral oils, or the so-called liquid silicones may be used. Supported in the container by supports 15 is a metal cylinder 16. The supports may be spaced about the cylinder and connected to the walls, it being the object to support the same in a relatively rigid manner in the container 10. The container 10 can be square or cylindrical, its form having no particular effect upon the invention. The main desideratum being that it be fluid tight, of a con-conducting material, and at least one portion transparent.

Suspended in the cylinder and equally spaced from the walls thereof is a ball 17. This ball is comprised of hollow semispherical halves 17a and 17b of thin conducting material which are held together and in spaced relation by a ring 18 of polystyrene or other good insulating material. The balls, halves 17a and 17b, may be metal, such as aluminum, or other metal, or they may also be of plastic and have their inner surfaces, their inner and outer surface, or just the outer surfaces, coated with a conductive material. In event the inner surface only is coated, connections must be brought through to the outside which causes certain complications which are not present in the use of conducting materials. Furthermore, the choice of materials will also be determined by the kind of radiation to be measured or detected.

The suspension of the ball is effected by a rod or wire like members 20 which are secured in the insulating ring 18 and are either journalled in the walls 10 or if the member is flexible may be secured in the wall. When the members 20 are flexible members and are secured into the wall, they are so fastened that the halves may normally be in a position as shown by the dotted lines 18' in Fig. 1.

If the ball is suspended for free rotation, a weight 22 is provided which has a tendency to rotate the ball to the position shown in 18'. In either event, the ball, without any charge on it, should be provided with means which tends to rotate the ball so that the ring 18 is oblique to the axis of the cylinder 16.

Means is provided to apply a charge or to charge the separate halves, 17a and 17b, to a difference in potential. This could be effected in several ways. For instance, the supporting members 20, if made of conducting material, could each be connected by wires such as 23a to the opposite halves, in this case the members 20 would extend exteriorly of the walls 10 and be adapted to have connections made thereto with a suitable source of potential. Obviously, certain precautions would have to be taken to insulate the connections exteriorly of the container to prevent current leakage.

A form of applying this difference in potential to the two halves 17a and 17b of the ball is illustrated in Fig. 1. In this case, the end wall 11-a is in the form of a corrugated disk, the circumferential corrugation 21 providing the desired flexibility. Secured in the walls 11a are a pair of contact members or pins 25 so disposed that when disk 11a is forced inward, each of the contact members will provide electrical connection to each of the ball halves 17a and 17b. The source of charging potential will be connected to the pins 25 exteriorly of the container.

I have stated that the container should have a fluid therein. This is not, however, absolutely essential since the device could be made to operate without the fluid. Furthermore, it may be desirable to fill the container completely with fluid. The use of fluid has a desirable dampening effect upon the motion of the ball, however, and in many instances will be preferred. It also relieves the weight of the ball in its bearings.

In operation, the interior of the ball constitutes an ionization chamber, it being filled with air. The two halves 17a and 17b comprise the electrodes which make the ionization chamber. When the two halves are charged to a potential difference, the halves have a tendency to line up in the cylinder with the ring 18 parallel to the axis of the cylinder; in this instance, perpendicular. This, as is apparent, is due to the well known laws of repulsion and attraction. The two ball halves being charged to opposite potentials cause the cylinder wall to assume an opposite charge in that part opposite each of the discrete and oppositely changed ball halves because of the proximity of the cylinder to the ball which causes the oppositely charged ball halves to be attracted to the wall. The rotation being controlled, the ball rotates around the axis until the dividing line between the ball halves is perpendicular. By carefully selecting the parameters of the device, a charge of a predetermined value, such as 50 or 100 volts, can be made to cause the ball to take a position wherein the separating ring will be nearly if not exactly parallel to the axis of the cylinder. As the device is subjected to radiation, the air inside the ball is ionized and the potential difference between the two halves is lowered.

Lowering of the potential difference decreases the attraction of the walls to the cylinder and the ball will then move, either by the weight 22 or through the torsion of the spring supports 20 toward and eventually to the position shown in the dotted lines in Fig. 1 which is the position taken by the ball when there is no longer any potential difference between the two halves.

Inasmuch as the volume of air in the chamber may be predetermined, it is possible to calibrate the apparatus in units such as roentgens. This is effected by placing the indicia 26 on the surface of the ball. A line 27 may be inscribed on the cover 11 for a reference point.

It will thus be seen that I have provided an exceedingly simple and economical indicating ionization chamber which may be designed to be carried on the person and wherein the state of charge may be determined at any time. It will be noted that the manner of discharge is similar to other ionization chambers, in that it is proportional to the amount of radiation. The indicating lines are likewise proportioned.

Figure 3:
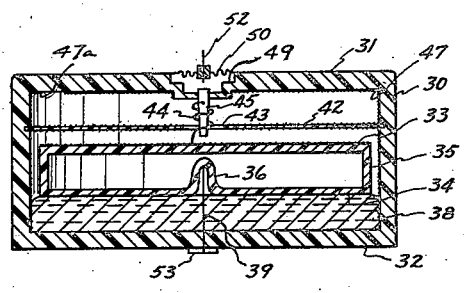
Fig. 3 is a vertical medial section illustrating another form of my invention.
Figure 4:
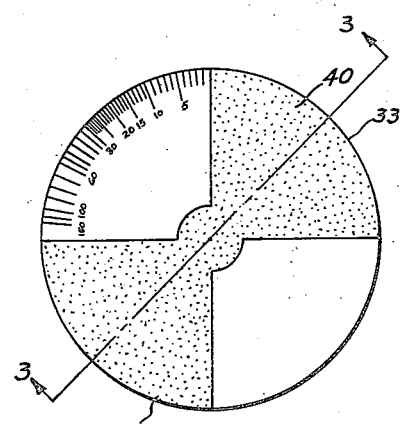
Fig. 4 is a plan view of the movable indicator element used in Fig. 3.
Figure 4A:
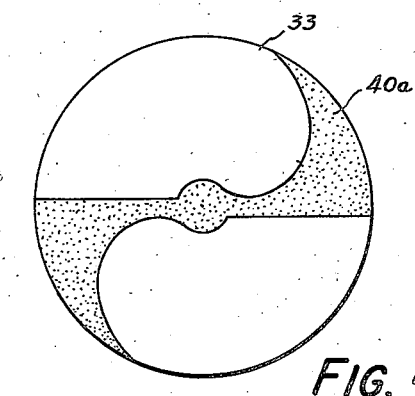
Fig. 4a is a modification thereof.

In Figs. 3 to 4a inclusive another embodiment of my invention is disclosed. This device is characterized by the provision of an ionization chamber, the effective volume of which varies with ionization.

As best shown in Fig. 3, I provide a casing which is constructed of an insulated material and, like that of Fig. 1, is preferably provided with at least one wall that is transparent. Generally, the preferred construction includes a cylindrical side wall 30 closed by flat end walls 31 and 32. The movable element in this instance takes the form of a flat wafer like hollow vane of insulating material, the upper flat surface 33 being of circular conformation. The bottom surface 34, which is held in spaced relation from the upper surface by the cylindrical side wall 35, is provided with an upwardly extending socket or detent 36. The vane floats on a pool of mercury 38. A guide pin 39 embedded in the bottom wall 32 extends upward through the mercury pool into the detent 36, holding the vane in a centered position in the casing but allowing it to otherwise float freely on the pool of mercury. This provides for an extremely free and substantially frictionless support for the vane. As best shown in Fig. 4, the upper surface of the vane, which constitutes the movable electrode for the ionization chamber, is formed with a pair of oppositely disposed quadrants of conducting material as indicated at 40. These surfaces may be formed of metal cemented to the upper side of the vane, deposited on the vane by electro-deposition or painted thereon. One substance particularly suitable for the surface is a solution of a colloidal graphite commonly known as "aqua-dag."

The other electrode for the chamber, and in this instance the fixed or non-moving electrode, is formed by a partition 42 disposed intermediate the top walls and the top of the vane. This partition may likewise be coated with quadrants in appearance similar to that in Fig. 4. Preferably, the portion is provided with a central opening 43 through which a helical spring 44 may extend, one end of the spring being secured to a pin or boss 45, and the other end being connected to the vane and making electrical contact with the conductive surface on the vane.

The interior walls may likewise be provided with a conductive coating 47 which is electrically connected to the coating on the wall 42 as well as being in contact with the pool of mercury. The boss 45 is carried by a re-entrant portion 49 of the wall 31, which is thus provided with a pocket in the wall above the boss 45. The upper end of this wall is closed by a circumferentially corrugated diaphragm 50 which carries at its center a contact pin 52. The centering pin 39 is provided with a lead wire which extends exteriorly of the bottom of the housing and is connected to a contact disk 53 which may be cemented on or embedded in the wall 32.

It has been pointed out that the conducting surface 40 of the vane and the conductive surface on the member 42 are of similar configuration except for the central opening 43 in the member 42. Preferably, these conducting portions on the two separate parts are insulated from each other. The tension on the hair spring 44 is so adjusted that when a charge of a predetermined voltage is applied to these separate elements, the attraction of the charged parts causes the conducting portions on the movable vane to move opposite to or nearly opposite to the conducting portion on the upper electrode, against the winding tension of the spring 44. Thus, the position of the electrically conducting surface on the vane is determined by the value of the charge and the tension of the spring. The two separate conducting surfaces thus provide the electrode of an ionization chamber, one of which is movable.

When it is desired to charge the chamber, one side of a known potential source is connected to the electrode 53. The other side of the voltage source is connected to the contact member 52. Pressure is then applied to the contact 52, and the flexibility of the wall 50 allows it to be forced down into contact with the boss 45, which is of conducting material, and the charge is then carried through the hair spring 44 to the movable vane. As the charge on the vane builds up the conductive portion of the movable vane moves into registry with the conductive portion on the fixed electrode. Having been charged, the pressure on the contact member 52 is removed and the charging source disconnected. The device is then ready for detection or measurement of radiation.

As the air between the electrodes is ionized by the radiation, the potential difference between the two electrodes is lowered and the hair spring rotates the movable vane so that the conductive surface thereon gradually moves out of registry with the conductive coating in the fixed electrode.

It is to be particularly noted that when the maximum charge is on the vane, or when the greatest or maximum desired potential difference is present, that the effectve area of the ionization chamber is greatest. However, as this potential difference is lowered and the electrodes move out of registry, the effective area changes. This has the effect that the sensitivity of the device is greatest immediately after charging and this sensitivity changes, becoming less sensitive, because of the decreased area, as the device is discharged. Therefore, the range of the measurements is extended materially. This is an advantage in that over a period of time, when subject to radiation, the decrease in sensitivity enables a greater amount of radiation to be measured without complete discharge of the chamber since, as shown in the drawings, the movement of the vane will not be in direct proportion to the decrease in the charge.

A suitable line may be inscribed upon the upper surface of the container which can be read against markings in the vane. These markings can be on the non-conductive portion of the vane, as shown in Fig. 4. The construction lends itself to a simple system of determining the charge since the non-coated portion of the movable electrodes moves under the fixed electrode and, therefore, the indication can be determined by reference to the lines at the point where they line up with the edge of the fixed electrode. An uncoated spot 47a may be provided on the wall 31 in event the entire interior of the chamber is coated.

The structure also lends itself ideally to certain variations wherein the shape of the coating and the electrodes may be varied to extend or shorten the range of readings. For instance, if the vane were coated with a conformation, as shown at 40-a in Fig. 4a, the range could be extended, assuming that the direction of the movement of the vane, upon discharge, was clockwise as viewed in all of the figures.

Figure 5:
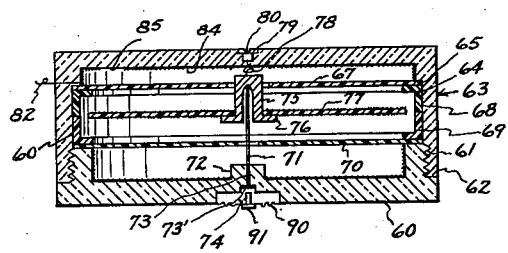
Fig. 5 is a vertical medial section of another form of my invention.

In Figure 5 I have shown another modification of my invention wherein there is provided a plastic case, of generally circular configuration, which includes a base 60 having an exteriorly threaded ring 61 thereon spaced from its periphery and adapted for threaded engagement with the lower portion of the skirt 62 of the cover 63.

In this instance, the movable vane is supported between a pair of stationary electrodes. To this end, the cover is counterbored, as indicated at 64, to provide an upper downwardly facing shoulder 65. The upper electrode 67 is held against the shoulder by a spacer ring 68 of inverted L-shaped cross section, this ring being engaged by a second similar ring 69, and the lower electrode 70 being engaged by the threaded ring 61 which thus clamps the entire assembly securely in position. The spacer rings 68 and 69 being L-shaped enable a large vane to be used. It will be appreciated that these two rings could be replaced by one solid ring if the movable vane was made smaller. The structure shown, however, not only enables a larger movable vane to be used, but the vane is prevented from contacting with the stationary electrode by the toe portions of the L-shaped spacers 68 and 69.

The vane is supported on a metallic pivot pin 71 which is carried by a boss 72 on the base. A lead 73 extends from the pin, or for that matter, the pin itself may extend through the boss, into a recess 74 formed in the bottom of the base. A contact 73' may be provided to which the pin or wire may connect.

The vane 77 preferably comprises a disc of plastic or the like secured to a metal socket 75, the vane being secured to a peripheral flange 76 on the socket. The surface of the vane is provided with a conductive coating, if desired, on both sides, the coating taking a configuration which may be the same or similar to that shown in Figs. 4 or 4a. The socket 75 makes contact with the coating.

The stationary electrodes are likewise provided with a conductive coating similar to that described for the electrode 42 in Fig. 3. A hair spring 78 is secured to the socket 75 and has the other end embedded in the plastic member 79 which may be provided with a slot 80 to enable the tension on the hair spring to be adjusted.

Contact with the stationary electrodes, for charging the same may be made by a lead 82 extending through the wall of the cover. I also find that in some instances it may be desirable to coat the interior of the case with a conductive coating. This is optional, however, for certain uses. In this event, the coating indicated at 84 covers the entire surface and side walls, except for the boss 72 and is also connected to the stationary electrode. The proximity of the vane to the stationary electrode affords the desired attraction, if the surface is coated, as described. A window 85 is provided by either a transparent portion of the wall or by leaving off the coating in a small area at this point. The bottom of the recess 74 is closed by a corrugated metallic diaphragm 90 which carries a contact pin 91. This enables the contact pin to be pushed into contact with contact 73' on the lead 73, in a manner similar to that described for Fig. 3.

The manner of operation is exactly the same as described for Fig. 3. The device has the advantage, however, that its construction is somewhat cheaper because of the elimination of the mercury and is also better adapted to carrying because there is no fluid to spill about the interior.

Figure 6:
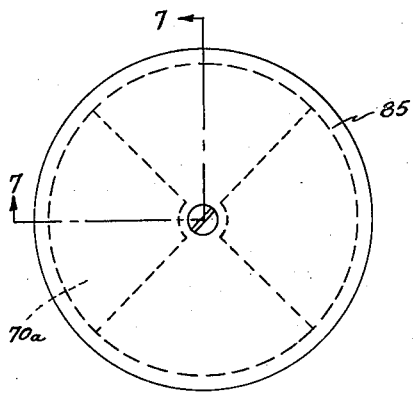
Fig. 6 is a plan view of another modified form of my invention.
Figure 7:
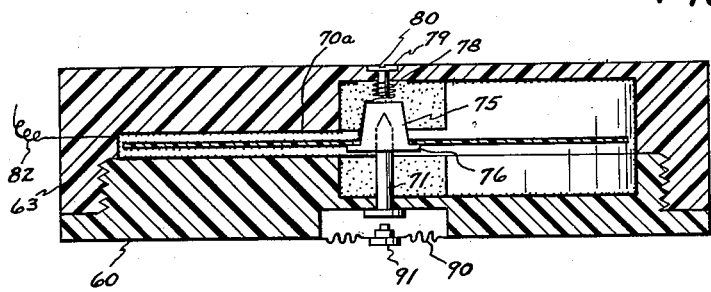
Fig. 7 is a section taken along the line 7—7 of Fig. 6.

In Figs. 6 and 7 I have shown a plan view of a modified form of the device, wherein the stationary electrodes are formed integral with the wall of the casing. In this case the opposing walls are formed with bosses 70a of the same shape as the stationary electrodes in Figs. 3 and 5. The walls 70a may be coated with a conductive material. If desired, the entire interior surface may be coated except for a window such as 85, of Fig. 5, then since the walls 70a are closer to the vane than the space intermediate the walls, the desired attraction to the vane is effected. Connections are likewise made to the stationary electrodes by a lead 82 extending through the wall and in electrical contact with the coating, while the connection to the vane is made through the flexible diaphragm 90 and its contact 91 with the pivot support 71 for the vane. Its operation is, otherwise, the same as that described.

So far, I have shown two manners by which the vane can be made to indicate, i. e., to cause it to rotate upon a decrease in the charge, there being the force of gravity as shown in Fig. 1 and by the springs as shown in Figs. 3 to 7. The vane can also be caused to rotate and by magnetic means if desired. In this case, no spring would be needed.

Figure 8:
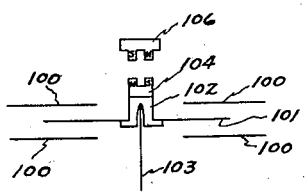
Fig. 8 is a fragmentary diagrammatic view of a modified form of vane rotating means.

An extremely simple manner of operating the vane magnetically and to thus replace the return spring is shown diagrammatically in Fig. 8. Here the stationary electrodes are illustrated at 100, the movable electrode at 101. The socket 102 which supports the movable electrode, and in turn is supported by the pivot pin 103 is either made of magnetic material or has secured to its upper end a small magnet 104 of U-shape having the upwardly extending poles as indicated. The cover of the case also carries a magnet 106 which has downwardly extending poles as indicated. The operation is obvious; since the like poles repel and the unlike poles attract, the tendency for the vane is to be rotated by its magnet 104 until the south pole lines up under the north pole of the magnet 106 which is fixed in its position. It will be apparent that the amount of attraction will depend on the distance the two magnets are apart.

Figure 9:
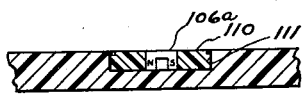
Fig. 9 is another arrangement of the device of Fig. 8.

Furthermore, it is not necessary that the two magnets extend in proximity to each other, for as shown in the fragmentary view of Fig. 9, the fixed magnet 106a could be disposed in the cover and would not extend into proximity to the socket magnet. Furthermore, as shown in Fig. 9, the magnet 106a may be mounted in a disk 110 of plastic which may be adjustably rotated in a recess 111 in the cover. This enables the vane to be centered or adjusted, the same as with the spring.

At this point, it should be noted that the spring and the magnet being adjustable, they can both be adjusted so that the vane tends to stay between the stationary electrodes instead of rotated out from between the electrode when it is discharged. With such an adjustment, it enables the high degree of sensitivity to be maintained over the period until its complete discharge. That is, if the magnet or spring is adjusted so that the vane stays between the electrode, it will not rotate out during discharge and, hence, the full capacity of the ionization chamber will be realized. In this case, when it is desired to read the instrument, the spring adjusting screw 79 of Fig. 5, or the magnet 106, must be rotated to the position where they would normally have been placed as described for the previous operation.

This would require a different set of calibration markings since the discharge in this instance would not be affected by the factor of a decreasing volume of ionization chamber. It would thus be possible to have a single instrument wherein extreme sensitivity is realized at the start of ionization and the sensitivity decreases as ionization proceeds, or one where the sensitivity remains the same for the complete operation. Obviously, according to the second described use, it would not have the extended range realized by the first described use.

Figure 10:
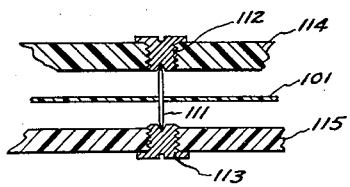
Fig. 10 is a view of a modified form of pivot structure for the vane.

I have found that with the more delicately balanced forms of the instrument, there is sometimes a tendency for the vane to tilt on its pivot due to the fact that one of its plates may move, when the instrument is moved or it is not level, closer to one of the stationary electrodes. This, of course, depends on the form of the pivot structure. This effect is undesirable because it places a strain on the pivot, increasing the friction and may cause certain variations or inconsistencies in the readings. One way of overcoming this tilt is to mount the vane between a pair of pivots in the same manner as the balance wheel of a watch. This is shown in Fig. 10 wherein the vane is indicated in fragment at 101 being mounted on a staff 111 which is supported between the bearings 112 and 113 disposed in the cover 114 and base 115 respectively. The same means previously described may be used for determining the portion of the vane between the stationary electrodes.

Figure 11:
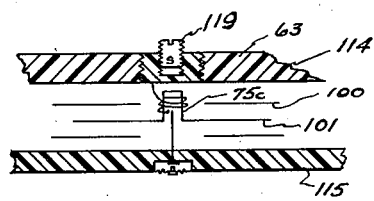
Fig. 11 illustrates a manner of steadying the movable vane.

Still another method of preventing tilting of the vane is illustrated in Fig. 11. Herein the structure disclosed is substantially the same as that shown in Fig. 5. In this instance, however, the socket 75c is formed of a magnetic material, and the cover 63 has embedded therein a bar magnet 119, the polarity of which is as indicated. The magnetic attraction of the magnet for the socket causes the socket to be attracted toward the magnet. This attraction should be such, however, as not to lift the socket off of its pivot. Preferably, the surface of the magnet is threaded so that its distance from the socket 75c may be adjustably determined. The magnet position is then adjusted to such a point that should the device become inverted, it will not adhere to the wall which separates the magnet from the socket but will return to its position when set upright. The attraction of the magnet will be sufficient to hold the socket upright and prevent the vane from tilting in the electrode.

Figure 12:
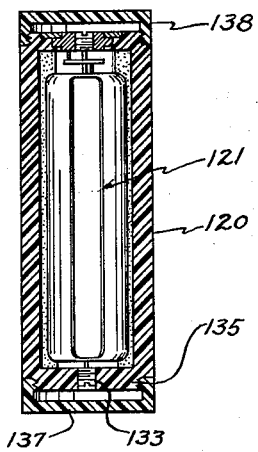
Fig. 12 is a vertical medial section of a modification of the invention with the vane shown in elevation.
Figure 13:
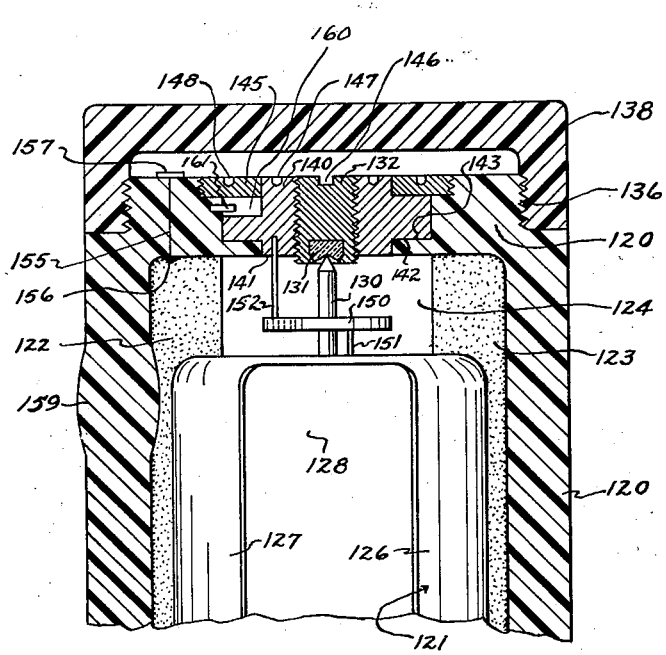
Fig. 13 is an enlarged fragmentary section thereof.

The previous embodiments, with the exception of Figs. 1 and 2, all show an ionization chamber having a more or less disc-like form. By reference to Figs. 12 and 13, it will be seen how my invention may be incorporated in a form which comprises an elongated cylinder. This enables a convenient pocket size device to be made which may be conveniently carried in the maner of a fountain pen or a pencil.

In this instance, the outer casing 120 is of tubular construction, and, as in the other devices, may be made of plastic. The vane 121 is also of elongated cylindrical form. The inner surface of the casing is coated with an electrically conductive material in opposite zones as indicated at 122 and 123, the coating extending for the length of the casing and in each zone, around the casing for 90 degree quadrants; the intermediate 90 degree quadrants are uncoated as indicated at 124. The vane may be constructed in several convenient forms. It may be plastic, having coated quadrants 126 and 127 formed on its opposite surfaces, or it may be of thin metal such as brass or aluminum. In event that it was made of metal, it would be in the general form of a hollow cylinder with the zones 128 intermediate the quadrants 126 and 127 cut out or removed. The distribution of the zones is similar to the disposition of the outer electrodes. If made of plastic, it should be made hollow in the interest of reducing its weight.

The vane is supported in a manner similar to the embodiments of Fig. 10. As can best be seen by Fig. 13, which is an enlarged fragmentary view, the upper end of the vane is provided with a pointed staff 130 which is pivoted in a jewel 131 disposed in an adjustable bushing 132. A similar bearing is provided for a staff on the other end as indicated at 133.

Both ends of the cylindrical casing may be provided with ends of reduced diameters which are threaded as shown at 135 and 136 and are adapted to receive threaded caps 137 and 138.

The bushings 132 and 133 enable the bearings to be adjusted as to pressure on the staffs. The top bushing 132 is carried by a disc of metal 140 which has a central boss 141 that provides a shoulder 142 surrounding the boss and is journalled in the upper end of the case, which is counted-bored at 143. This disc is held in place by a threaded member 145 as shown.

The bushing 132 is provided with a slot 146 for receiving an adjusting tool. The disc 140 is provided with a pair of holes 147 for receiving a spanner wrench or other tool by which it may be rotated. The member 145 is likewise provided with spanner wrench holes 148 for screwing the same in place.

The hair spring 150 in this instance is in the form of a flat spring coiled spirally about the staff. The inner end is secured to a pin 151 secured on the vane, and the outer end is secured to a pin 152 carried by the member 140.

A connection is provided for the outer electrodes 122—123 by a lead 155 which extends through the wall 120 and is conductively connected at 156 to the coating and is connected to a contact plate 157 in the outer upper surface of the wall.

The tension of the hair spring is determined by the position of the member 140 which is rotatable in the wall 120. Preferably, a close enough fit is provided so that once adjusted, it will remain in its adjusted position. If desired, a small drop of cement may be applied to the edge of the member 143 and its retaining nut 145 to assure that it remains in a fixed position.

Electrical connections to the inner movable electrode is provided through the member 140, the pin 152, hair spring 150 and pin 151.

Inasmuch as the travel of the vane, due to its small diameter, is relatively small as compared to the other devices, it may be desirable to mold into the chamber wall a lens indicated at 159, whereby indicia on the surface, not shown, is magnified and permits more accurate reading. It will be appreciated that the lens is preferably at the edge of the coated section, particularly where a plastic vane is used. In the case of the metallic vane, however, the indicia will necessarily have to be on the electrode itself.

The end caps being removable enable the bearings to be adjusted as desired. The cap 138 is removed when it is desired to charge the device. Contact with a source of potential, for charging it, is had through the contact 157 and the member 143.

The device operates in the manner previously described.

If desired, the member 143 may be provided with a notch 160 extending through a predetermined arc around its periphery. A pin 161 in the wall 120 extends into this notch and the member 143 may thus be rotated only within the limits of the notch, since the pin engages at each of the extremities upon the rotation of the member. This affords a convenient manner of decreasing or increasing the tension of the hair spring to carry out the method of use previously described, wherein the hair spring is so adjusted that the vane does not rotate upon discharge of the chamber. The amount of charge can be determined at any time by merely rotating the member 143 within the limits of the notch 160, to increase the tension of the hair spring to a predetermined amount. As previously stated, it may be operated with the tension on the hair spring to provide the improved action due to the decrease in area of the chamber as the charge decreases through ionization.

Having thus described my invention, I am aware that numerous and extensive departures may be made therefrom without departing from the spirit or scope of the invention.

I claim:

1. An ionization chamber having at least two electrodes insulated from each other and arranged to be charged to a potential difference, said electrodes defining a chamber having a predetermined ionizable volume of gas one of said electrodes being suspended for swinging movement, and means for moving said movable electrode to decrease the effective volume of the chamber upon a decrease in potential difference between the electrodes.

2. An ionization chamber including electrodes disposed in spaced relation to each other, formed to provide a predetermined area and providing a definite electrostatic capacity adapted to receive an electric charge, means to vary the electrostatic capacity during the discharge of said chamber by a factor of at least two which includes means for supporting one of said electrodes in movable relation to the other and means for holding said electrodes in a predetermined position in the presence of a charge and moving at least one of said electrodes upon a decrease in charge, at least one electrode being in the form of a conducting surface of a predetermined configuration which, when moved relative to the other electrode, decreases the electrostatic capacity between the electrodes.

3. A radiation indicating device including an insulated casing, an electrically conducting member supported in said casing, an ionization chamber supported in said casing in electrically attractive relation to said conducting member, and an insulating fluid in said casing in contact with said conductor and ionization chamber.

4. A radiation indicating device including an insulating casing having at least one transparent wall, an electrically conducting cylinder disposed in said casing, an ionization chamber suspended in said cylinder in electrostatic capacitive relation to said cylinder, said chamber adapted to receive a charge therein and means to move said chamber upon a decrease in said charge.

5. A radiation indicating device including an insulated casing, a transparent portion for said casing, a cylinder supported in said casing on a vertical axis, an ionization chamber supported in said cylinder substantially equi-distant from the wall thereof, said chamber adapted to receive a charge and to be electrically attracted to the wall of said cylinder, and means on said chamber to move said chamber upon a decrease of the charge thereon.

6. A radiation indicating instrument comprising a container, a transparent wall for said container, a cylinder supported in said container in insulated condition therefrom, an ionization chamber supported in said cylinder and including a hollow member of predetermined capacity formed with at least two electrodes, said electrodes being electrically attracted to each other through the wall of said cylinder, said chamber adapted to have said electrodes charged to a predetermined potential difference, and means connected to said member to rotate said member upon a decrease in said charge during ionization.

7. A radiation indicator comprising a container having at least one transparent wall, a conducting cylinder supported in said chamber with its axis in a substantially vertical position, an ionization chamber supported in said cylinder in electrostatic inductive relation to the inner wall thereof and comprising a pair of substantially semispherical hollow conducting members held in spaced relation to each other by an electrically insulating ring and forming a hollow sealed ionization chamber, means to charge said conducting members in said ball to a predetermined potential difference, said conducting members being electrically attracted to each other through their static inductive attraction through said cylinder, and means to rotate said ball when said charge is dissipated by ionization of the air in said ionization chamber.

8. A radiation indicator comprising a container having at least one transparent wall, a conducting cylinder supported in said chamber with its axis in a substantially vertical position, an ionization chamber supported in said cylinder in electro-static inductive relation to the inner wall thereof and comprising a pair of substantially semispherical hollow conducting members held in spaced relation to each other by an electrically insulating ring and forming a hollow sealed ionization chamber, means to charge said conducting members in said ball to a predetermined potential difference, said conducting members being electrically attracted to each other through their static inductive attraction through said cylinder, and means to rotate said ball when said charge is dissipated by ionization of the air in said ionization chamber, and fluid means in said container in fluid contact with said ball.

9. An indicating pocket ionization chamber comprising a sealed casing of insulation material, a stationary electrode supported by the wall of the casing, a movable electrode for said chamber and means for floating said movable electrode in said chamber in spaced relation to the stationary electrode to provide an ionizable space therebetween comprising a liquid in said chamber.

10. An ionization chamber including a sealed housing, a stationary electrode disposed in the housing, a movable electrode in cooperating relation with the stationary electrode and means for floating said movable electrode in spaced relation to the stationary electrode to provide an ionizable space therebetween comprising a liquid in said chamber and a second means for restraining the movement of the movable electrode.

11. An ionization chamber, a housing, a stationary eelctrode disposed in the housing and formed with a pair of electrically conductive oppositely disposed quadrants, a movable electrode, a pool of mercury in the bottom of said housing, said movable electrode being floated on said pool of mercury and comprising an insulated disc-like member having its upper surface formed with a pair of oppositely disposed quadrants of conductive material and its lower surface in contact with said mercury, a centering pin extending into contact with said movable electrode for holding it centered on said pool of mercury and means for resiliently holding said movable electrode in a predetermined position relative to the stationary electrode.

12. An ionization chamber including a stationary electrode, a movable electrode, said electrodes being disposed in spaced relation to each other and defining the boundaries of an ionizable space therebetween, means to support said movable electrode for movement into position juxtaposed to the stationary electrode, said movable electrode adapted to move to said position upon charging said electrode to a potential difference, and spring means connected to said movable electrode to rotate it from said position upon a decrease in potential difference.

13. An ionization chamber including a casing, a pair of stationary electrodes disposed in spaced relation in said casing, a movable electrode, said electrodes being disposed in spaced relation to each other and defining the boundaries of an ionizable space therebetween, pivot means to support the movable electrode for movement between the stationary electrodes, means connected to said movable electrode for restraining its movement between the stationary electrodes and means connected to said movable and stationary electrodes for charging them to a difference in potential, said means including connections to the electrode and a potential source, and means carried by the movable electrode to indicate the state of charge thereon said restraining means arranged to move said movable electrodes upon a decrease in said charge from between the stationary electrodes.

14. An indicating ionization chamber comprising at least one stationary electrode shaped in the form of a pair of diametrically opposed quadrants, a movable electrode formed in the shape of a pair of diametrically opposed quadrants, said electrodes being disposed in spaced relation to each other and defining the boundaries of an ionizable space therebetween, pivot means for supporting the movable electrode adjacent the stationary electrode, said movable electrode being movable by electro-static attraction into alignment with the stationary electrode, and means to move said movable electrode out of alignment with the stationary electrode upon a decrease in electro-static attraction therebetween and indicator means on said movable electrode for indicating the state of charge thereof.

15. An indicating ionization chamber comprising at least one stationary electrode shaped in the form of a pair of diametrically opposed quadrants, a movable electrode formed in the shape of a pair of diametrically opposed quadrants, pivot means for supporting the movable electrode adjacent the stationary electrode, said movable electrode being movable by electro-static attraction into alignment with the stationary electrode, and magnetic means to move said movable electrode out of alignment with the stationary electrode upon a decrease in electro-static attraction therebetween and indicator means on said movable electrode for indicating the state of charge thereof.

16. An indicating ionization chamber comprising at least one stationary electrode shaped in the form of a pair of diametrically opposed quadrants, a movable electrode formed in the shape of a pair of diametrically opposed quadrants, said electrodes being disposed in spaced relation to each other and defining the boundaries of an ionizable space therebetween, pivot means for supporting the movable electrode adjacent the stationary electrode, said movable electrode being movable by electro-static attraction into alignment with the stationary electrode, and spring means to move said movable electrode out of alignment with the stationary electrode upon a decrease in electro-static attraction therebetween and indicator means on said movable electrode for indicating the state of charge thereof.

JOHN A. VICTOREEN.

REFERENCES CITED

The following references are of record in the file of this patent:

UNITED STATES PATENTS

| Number | Name | Date |
| --- | --- | --- |
| 500,236 | Kennelly | June 27, 1893 |
| 627,155 | Thomson | June 20, 1899 |
| 1,294,710 | Roland | Feb. 18, 1919 |
| 1,933,063 | Kolhorster | Oct. 31, 1933 |
| 2,022,117 | Lauritsen | Nov. 26, 1935 |
| 2,192,148 | Otto | Feb. 27, 1940 |

FOREIGN PATENTS

| Number | Country | Date |
| --- | --- | --- |
| 319,202 | Germany | Feb. 27, 1920 |
| 3,061 | Great Britain | June 28, 1882 |
| 128,843 | Germany | Aug. 13, 1901 |
| 400,653 | Great Britain | Oct. 30, 1933 |
| 405,750 | France | Nov. 23, 1909 |

OTHER REFERENCES

Strong, Procedures in Experimental Physics, Prentice Hall, New York, Oct. 1938, pgs. 232-233, pgs. 245-248.